(12) United States Patent
Hambley et al.

(10) Patent No.: US 7,138,056 B2
(45) Date of Patent: *Nov. 21, 2006

(54) FILTER UNDERDRAIN SYSTEM FOR BACKWASH FLOW AND METHOD FOR MEASURING SAME

(76) Inventors: David M. Hambley, Suite 202, 7260 - 12th Street S.E., Calgary, Alberta (CA) T2H 2S5; Philip Hambley, Suite 202, 7260 - 12th Street S.E., Calgary, Alberta (CA) T2H 2S5

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/303,306

(22) Filed: Apr. 30, 1999

(65) Prior Publication Data

US 2003/0132169 A1    Jul. 17, 2003

(51) Int. Cl.
    B01D 24/38    (2006.01)
(52) U.S. Cl. .................. 210/274; 210/275; 210/293
(58) Field of Classification Search .............. 210/274, 210/275, 289, 291, 293
    See application file for complete search history.

(56) References Cited

U.S. PATENT DOCUMENTS

| 4,331,542 A | * | 5/1982 | Emrie ..................... 210/293 |
| 4,619,765 A | | 10/1986 | Roberts .................. 210/289 |
| 4,627,923 A | | 12/1986 | Ross ..................... 210/744 |
| 4,771,804 A | | 9/1988 | Morales .................. 137/412 |
| 5,019,259 A | | 5/1991 | Hambley .................. 210/274 |
| 5,149,427 A | | 9/1992 | Brown et al. ............. 210/274 |
| 5,269,920 A | | 12/1993 | Brown et al. ............. 210/274 |
| 5,865,999 A | | 2/1999 | Shea et al. .............. 210/289 |
| 5,976,370 A | * | 11/1999 | Medworth ................ 210/291 |

FOREIGN PATENT DOCUMENTS

| WO | WO 91/10493 | 7/1991 |
| WO | WO 97/040907 | 11/1997 |

OTHER PUBLICATIONS

AWI brochure, "The AWI Phoenic Underdrain System", date unknown but at least as early as Apr. 30, 1998.

\* cited by examiner

*Primary Examiner*—Ivars C. Cintins

(57) ABSTRACT

A filter underdrain system and a method for measuring the water flow through the underdrain filter system. The apparatus includes panel members assembled to form a perforate grid on the filter base structure of an underdrain block. The panels are generally rectangular and have an upper and lower surface. Multiple apertures are provided in the panel member. The number and/or size of the apertures are dimensioned to prevent the egress of filter media and to obtain substantially uniform backwash flow in the underdrain thereby reducing or eliminating water maldistribution.

12 Claims, 17 Drawing Sheets

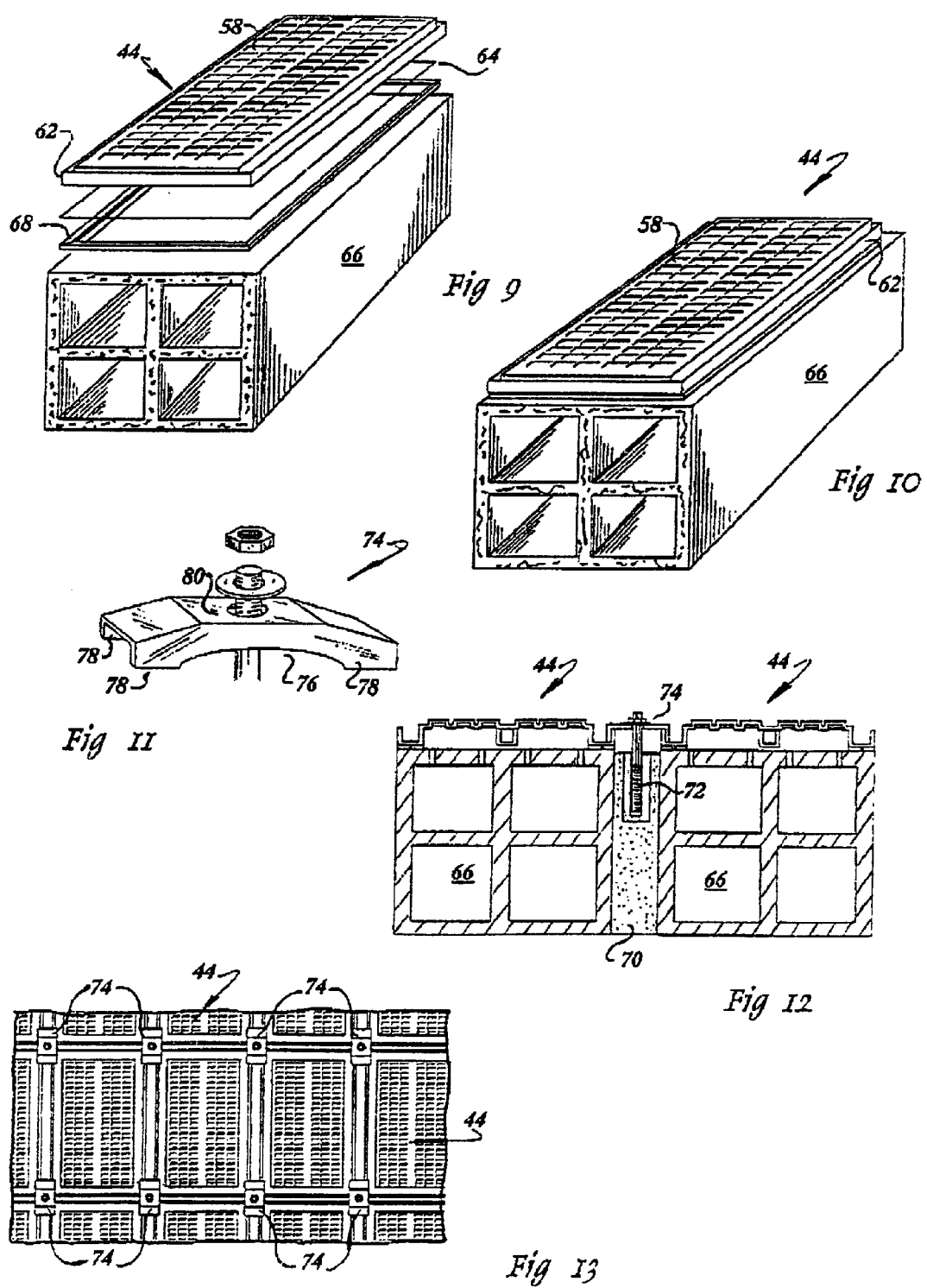

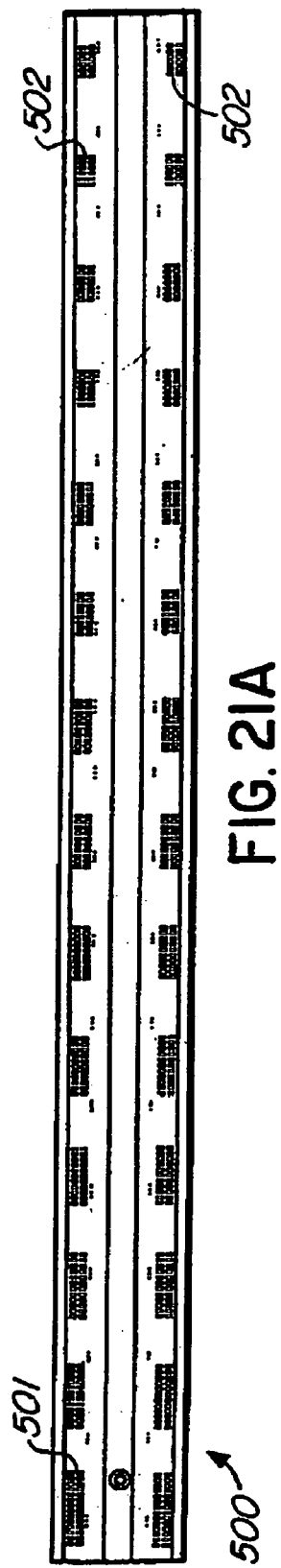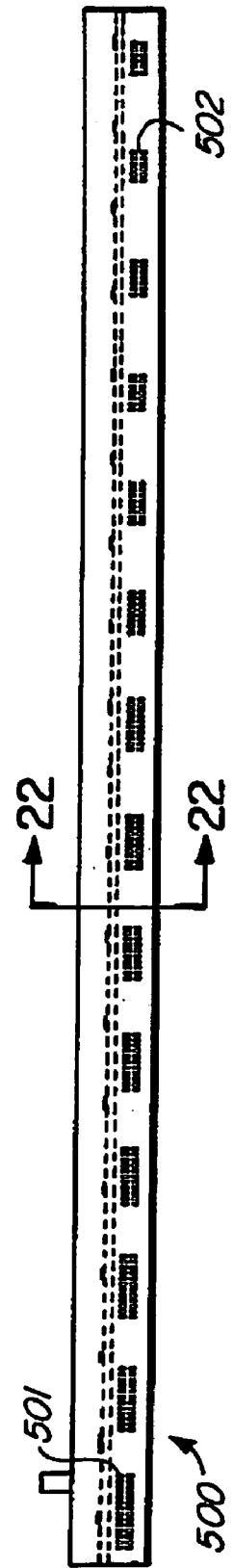
FIG. 21A
FIG. 21B

FILTER UNDERDRAIN SYSTEM FOR BACKWASH FLOW AND METHOD FOR MEASURING SAME

FIELD OF THE INVENTION

This invention relates to filter underdrain systems for granular media filters and, more particularly, to an apparatus intended to improve backwash water flow to a filter bed and to a method for assisting in the design of such apparatus.

BACKGROUND OF THE INVENTION

The traditional rapid sand filter has been a reliable performer in potable water treatment and the mechanics of the operation and performance of such a filter have remained largely unchanged over the years. The filter is a straining device comprising a bottom underdrain collection system equipped with slotted strainers or the like which holds a layer of filter sand. Above the sand layer is a layer (or layers) of hard coal media which is coarser. A wash water trough is located above the media layers and is used to direct unfiltered water into the filter as well as to channel backwash rinse water to a waste outlet. A backwashing cycle is required when the filter media has substantial head loss during operation, sometimes occurring several times a day due to particle buildup in the filter. Backwashing fluidizes the media, rinses out the particles from the interstitial voids and reclassifies the layers of media A problem associated with backwashing is the non-uniform or uneven water distribution which occurs because of the momentum of the water discharging from the perforated header or channel. Water at high velocity across an orifice will not be discharged through the orifice as readily as when flowing at lower velocity. Backwash discharge from the underdrain will be greatest in those portions of the underdrain furthest away from the backwash water inlet. Such unequal flows cause undesirable channelling in the media which reduces the efficiency of the backwash operation and results in filtering problems.

A further problem with many types of filter is the requirement for a support gravel layer immediately above the underdrain upon which the sand layer rests. This requirement results in a deeper overall bed and increased material requirements for the filter installation. The need for a support gravel layer also restricts the available depth for the sand and coal layers which reduces the filtration effectiveness.

The above-identified problems are discussed in various patents. Such prior art patents include U.S. Pat. No. 3,956,134 (Sturgill) dated May 1976 and entitled UNDERDRAIN FOR WATER FILTRATION SYSTEM; U.S. Pat. No. 4,214,992 (Sasano et al) dated August 1978 and entitled WATER COLLECTING AND DISTRIBUTING APPARATUS DISPOSED IN A LOWER PORTION OF HIGH SPEED FILTER BASIN; U.S. Pat. No. 4,331,542 (Emrie) dated August 1980 and entitled UNDERDRAIN UNIT WITH AIR/WATER BACKWASH FOR GRANULAR FILTRATION SYSTEM; U.S. Pat. No. 4,923,606 (Gresh et al) dated February 1988 and entitled PLASTIC JACKETED FILTER UNDERDRAIN BLOCK; U.S. Pat. No. 4,995,990 (Weston) dated April 1989 and entitled AIR AND WATER DISTRIBUTION CONDUIT; U.S. Pat. No. 5,068,034 (Walter) dated May 1990 and entitled PURIFICATION UNDERDRAIN WITH MEANS COMPENSATE FOR FLOW AND PRESSURE DIFFERENCES BETWEEN LATERALS; U.S. Pat. No. 5,160,614 (Brown) dated February 1992 and entitled AIR DUCT BLOCK FOR AIR/WATER UNDERDRAIN SYSTEMS IN GRAVITY FILTERS; U.S. Pat. No. 5,149,427 (Brown et al) dated September 1992 and entitled CAP FOR UNDER DRAINS IN GRAVITY FILTERS; U.S. Pat. No. 5,413,710 (Roberts et al) dated May 1995 and entitled LATERAL UNDERDRAIN; and U.S. Pat. No. 5,462,664 (Neuspiel) dated October 1995 and entitled FILTER UNDERDRAIN MODULE AND UNDERDRAIN SYSTEM.

The prior art identified above suffers from other problems, such problems including that the devices disclosed are not readily adaptable for retrofitting to existing filter installations; that the devices are prone to plugging with grit flushed in during the backwash cycle and are therefore less resistant to structural failure during the large upward hydraulic thrust generated during backwash; that the devices are expensive to purchase and are difficult and expensive to install, some requiring tedious grouting procedures or cumbersome and expensive false bottom structures; that many of the devices are constructed from tile or porous tile or the like and are therefore fragile and subject to breakage during installation while inadequate corrosion resistance is also present; and that some devices require support gravel layering.

Our earlier U.S. Pat. No. 5,019,259 (Hambley) dated May 28, 1991 and entitled FILTER UNDERDRAIN APPARATUS WITH PARTITIONED DISTRIBUTOR CONDUITS, the contents of which are incorporated herein by reference, teaches a filter underdrain apparatus which includes a steel flute or arch forming a plurality of horizontal distributor conduits. The conduits are in juxtaposed, laterally spaced relationship and are constructed to define alternating conduits and troughs of a filter underdrain. This apparatus functions well with or without support gravel and reduces backwash water maldistribution by varying the diameter of the water inlet/outlet orifices arranged along the length of the water conduits. While this apparatus is effective in overcoming many of the problems of the prior art, the effective diameter of each individual inlet/outlet orifice in the flute or arch needed to be calculated and attendant tool changes were required during the manufacturing process to accommodate the variations in orifice size along the flute.

SUMMARY OF THE INVENTION

According to the invention, there is provided a filter underdrain assembly for controlling backwash water flow in a filtration system having a backwash water inlet, said filter underdrain assembly comprising a plurality of panel members forming a grid like underdrain, each panel member having a plurality of apertures, the cross-sectional area of said apertures in said panel members varying between said panel members, said apertures of said panel members being located further away from said backwash water inlet of said filtration system having a lesser cross-sectional area relative to said cross-sectional area of said apertures of said panel members closer to said backwash water inlet of said filtration system.

According to a further aspect of the invention, there is provided a filter underdrain apparatus for controlling backwash water flow maldistribution in a filtration system from a backwash water inlet, said filter underdrain apparatus comprising a plurality of panel members assembled adjacent each other to form a grid like underdrain, each panel member having multiple punched bridges in a surface thereof, each bridge defining a pair of slotted water inlet/outlets and wherein the number and/or size of said punched bridges are varied from panel member to panel member, said panel members furthest away from said backwash water inlet of said filtration system having a lesser number of bridges or smaller slotted inlet/outlets from said panel members nearer to said backwash water inlet of said filtration system, said panel members being operable to provide a substantially equalized water flow through the underdrain assembly from said panel members.

According to yet a further aspect of the invention, there is provided a filter underdrain assembly for controlling backwash water flow from a backwash water inlet associated with a filtration system, said filter underdrain assembly comprising a plurality of panel members forming a grid like underdrain, each panel member having a plurality of apertures, the number or cross-sectional area of said apertures varying between said panel members, said panel members located further away from said backwash water inlet of said filtration system having a lesser number or smaller cross-sectional area of said apertures relative to those of said panel members located closer to said backwash water inlet of said filtration system, said panel members being operable to substantially equalize water flow from each of said panel members of said filter underdrain assembly.

According to yet a further aspect of the invention, there is provided a method of measuring backwash water flow through a filter underdrain assembly comprising the steps of removably attaching at least one housing to said underdrain, initiating a backwash cycle and measuring the rate of water flow from said underdrain into said housing.

According to still yet a further aspect of the invention, there is provided a filter underdrain apparatus for controlling backwash water flow maldistribution from a backwash water inlet in an underdrain assembly comprising a plurality of panel elements assembled adjacent each other to form a grid like underdrain, each panel element having multiple punched bridges in a surface thereof, each bridge defining a pair of water inlet/outlet slotted apertures and wherein the number and size of said punched bridges and slotted apertures respectively can be varied from panel element to panel element, said panel elements furthest away from said backwash water inlet having a lesser number of bridges or smaller slotted apertures from said panel elements nearer to said backwash water inlet, said panel elements being operable to provide a substantially equalised water flow through the underdrain assembly from said panel elements.

According to yet a further aspect of the invention, there is provided a filter underdrain assembly for controlling backwash water flow from a backwash water inlet comprising a plurality of panel members forming a grid like underdrain, each panel member having a plurality of apertures, the number or cross-sectional area of said apertures varying between said panel members, said panel members located further away from said backwash water inlet having a lesser number or smaller cross-sectional area of said apertures relative to said panel members located closer to said backwash water inlet, said panel members being operable to substantially equalize water flow from each of said panel members of said filter underdrain assembly.

According to yet a further aspect of the invention, there is provided a filter underdrain panel member for controlling backwash water flow from underdrain blocks, said panel member having a predetermined number of apertures therein to allow passage of water therethrough, an attachment for mechanically positioning said panel member on said underdrain blocks and a sealing member to provide a substantially watertight seal between said panel member and said underdrain block.

According to still yet a further aspect of the invention, there is provided a filter underdrain assembly comprising an arch extending longitudinally in said underdrain assembly from a water inlet generally located adjacent one end of said arch, said arch being positioned above said underdrain assembly and allowing water from said water inlet to enter the interior of said arch, said arch having a plurality of perforations extending the length of said arch, said plurality of perforations having larger cross-sectional area nearer said water inlet, said plurality of perforations having smaller cross-sectional area further from said water inlet.

According to yet a further aspect of the invention, there is provided a method of equalizing backwash water flow in a filter underdrain assembly having a water inlet and a plurality of blocks located relatively closer and relatively further from said water inlet, said plurality of blocks having an upper surface and a water passageway, holes extending between said water passageway and said upper surface, said method comprising blocking a predetermined number of said holes in a specific number of said blocks such that the quantity of water flowing from said upper surface of said blocks located relatively closer to said water inlet is substantially similar to said quantity of water flowing from said blocks located relatively further from said water inlet.

BRIEF DESCRIPTION OF THE SEVERAL VIEWS OF THE DRAWINGS

Specific embodiments of the invention will now be described, by way of example only, with the use of drawings in which:

FIG. 9 is an isometric exploded view of a panel member according to the present invention particularly illustrating the relationship of the panel member and the seals, relative to the filter underdrain block;

FIG. 10 is an isometric view of the assembled panel member and underdrain block of FIG. 9;

FIG. 11 is an isometric view of a clamping bracket used to secure adjacent ones of the panel members of FIG. 1;

FIG. 12 is a sectional view of the panel members in a secured position on the filter underdrain blocks and further using the assembled position of the clamping bracket of FIG. 11;

FIG. 13 is a partial plan view of the grid structure formed by securing a plurality of panel members to the filter underdrain blocks;

FIGS. 21A, 21B and 21C are plan, side and partial bottom views, respectively, of an arch or flute with air scouring capability according to a further aspect of the invention;

DESCRIPTION OF SPECIFIC EMBODIMENT

The media bed of an underdrain acts as a filter medium for obtaining potable water. Filtration occurs when a feedwater particle is larger than the pores between two adjacent filtering granules thereby preventing passage of the particle through the bed. Likewise, when feedwater particles pass close enough to the surface of a media granule, the particle may be adsorbed onto the granule.

As the filtering action continues, more and more spaces or pores between filtering granules become plugged. As the pores plug, the flow rates through other pores increase to maintain the set flow rate of the bed. Particles previously adsorbed in the latter pores are then subjected to higher flow rates which may strip off the particles. The number of particles exiting the filter bed may therefore actually exceed the number of particles entering the bed. To prevent this, a backwashing operation is performed. To perform backwashing, filtered feedwater is pumped up through the bed by reverse flow. This fluidizes the media and rinses out the dislocated particles from the interstitial voids. The backwash water is discharged and the filter media are then relatively clean thereby to allow commencement of a more efficient filtering action.

A significant problem associated with the backwashing operation is the non-uniform or uneven backwash water distribution which occurs because of the momentum of the water passing through the perforated header or channel. Water passing individual orifices in an underdrain at a relatively high velocity will not be discharged from the orifice as readily as when flowing at a relatively lower velocity. Hence, backwash flow through the filter underdrain will be greater in those portions of the underdrain farthest from the backwash water inlet. Over time this can cause significant disruption of the filter bed by the aforementioned "channelling" with the accompanying deterioration in filter performance.

Figure 1:
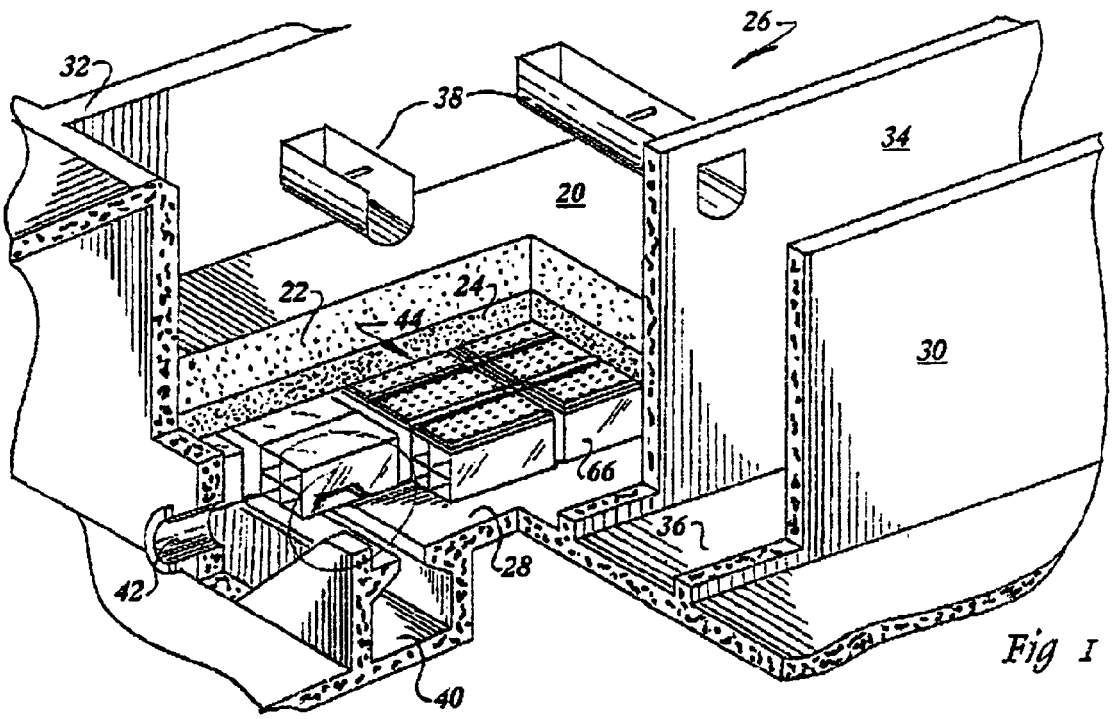
FIG. 1 is an isometric partially sectional view of a water filter tank or basin incorporating the apparatus according to the present invention.

With reference now to FIG. 1, the filter underdrain system according to the present invention is generally illustrated at 44. It is shown within a bed 20 of filter media which includes a top layer 22 of anthracite coal followed by a layer of sand 24. A supporting gravel layer is not illustrated below the sand layer 24 which gravel, however, may optionally be provided if desired.

Filters according to the prior art generally use a top layer of anthracite 22 over a layer of sand 24 as illustrated. However, filters may operate without the anthracite layer 22. A layer of fine heavy material, such as garnet or ilmenite may also be used under the filter sand. Other filters may operate with materials such as manganese dioxide, magnesium oxide, activated carbon and the like.

The filter underdrain 44 and the bed 20 are located in a concrete, open top tank or basin generally illustrated at 26 which is defined by bottom slab 28, side walls 30 and end walls 32. A partition 34, parallel to side wall 30, defines an overflow trough or gullet 36 for receiving backwash water from semicylindrical metal, concrete or fiberglass troughs 38, which troughs 38 extend transversely of the basin 26 above bed 20 as is illustrated. The troughs 38 distribute the incoming water and discharge the collected backwash water.

A further trough or flume 40 is provided in the bottom of the basin 26 at one end thereof for receiving the backwash water. Filtered water is discharged from flume 40 via pipe 42. Pipe 42 is also used to introduce backwash water back into the flume 40, the media and then to the trough 40 and basin 26.

Referring to FIGS. 2 through 8, a filter underdrain panel according to the present invention is generally illustrated at 44. It takes a generally rectangular form which is defined by end walls 46, side walls 48 and inner panel 50. Inner panel 50 has an upper surface 52 and a lower surface 54. An elongate brace member 56 is centrally located on lower surface 54 of inner panel 50 and transverse to end walls 46. Brace member 56 is used for rigidity purposes.

Inner panel 50 further includes a multiple of generally rectangular apertures in the form of punched bridges 58 (FIG. 4), the bridges 58 being substantially equidistance from each other and arranged by row and column. Each bridge 58 defines a pair of slotted water inlet/outlet apertures 60 (FIG. 7) through the upper and lower surfaces 52, 54 of the inner panel 50. The slotted apertures 60 are of a dimension sufficiently small to substantially prevent the passage of filter media thereby allowing for the elimination of a support layer of gravel above the panels 44 which gravel is principally used to support the sand layer resting thereon.

The end walls 46 and side walls 48 of panel member 44 also conveniently include a single row of similarly punched apertures or bridges 58 to provide for cleaning of the filter media between adjacent panel members 44.

A perimeter flange 62 has a generally L-shaped configuration in cross-section and extends outwardly from the end walls 46 and side walls 48 as is illustrated.

A gasket retention wire 64 (FIG. 9) of generally circular cross section is attached to the undersurface of the horizontal portion of perimeter flange 62. A sealing gasket 68 is positioned between the underdrain block 66 and the sealing wire 64 as will be explained.

OPERATION

The filter underdrain panels 44 are installed on the upper surface of conventional underdrain blocks 66 with each panel 44 being dimensioned so as to form a cap for each of the underdrain blocks 66 (FIG. 9). A substantially watertight seal is formed between the panel 44 and the underdrain block 66 by inserting sealing gasket 68 made from rubber or other elastomer material between the lower surface of the horizontal wall of the perimeter flange 62 of the panel 44 and the upper surface of the underdrain block 66. The sealing wire 64 applies point pressure on the gasket 68 to ensure that the gasket 68 conforms to surface irregularities of the underdrain block 66 as well as to the undersurface of the horizontal wall of the perimeter flange 62.

The placement of panels 44 in the FIG. 1 embodiment follows the placement of the underdrain blocks 66 and will result in a perforate grid like formation of panels 44 (FIGS. 12 and 13). The panels 44 are secured to the underdrain blocks 66 by drilling a perpendicular hole into the mortar 70 (FIG. 12) between adjacent underdrain blocks 66, inserting and cementing in place a non-expanding anchor 72 and utilizing a clamping bracket 74 fastened to the anchor 72 by a threaded nut. Clamping bracket 74 (FIG. 11) includes an elongate portion of rigid channel material having semicircular or elliptical cutaways 76 on either side thereof to define four (4) pads or contact areas 78, two at each end, and being substantially centered about hole 80. Hole 80 is dimensioned to allow insertion of the bracket 74 over the anchor 72 such that each of the contact areas 78 engage one corner of a perimeter flange 62 on four adjacent panels 44 while the side cutaways 76 allow clearance of the end walls 62 of panel members 44. Other methods of attachment could clearly be used.

The dual slotted apertures 60 (FIG. 7) act as water inlets during the filtration cycle and water outlets during the backwash cycle. Accordingly, the sizes of such apertures 60 are relevant since water flowing at relatively high velocity past an aperture will not be discharged through that aperture as readily as the same volume of water flowing at a lower velocity past the same sized aperture.

Thus, the number and size of the punched bridges 58 and their slotted apertures 60 incorporated into any given panel member 44 define the ratio of open space to closed space for the particular panel 44 and thereby controls the degree of water distribution into the above media bed acceptable in the particular underdrain system from each panel 44 and further prevents "jetting" of the water into the media bed. By increasing or decreasing the number of apertures 60 in any given panel 44 or, likewise, by varying the size of the slotted apertures 60, the quantity of water passing can be varied as desired.

Alternatively, the number of apertures 60 may be varied in a specific panel 44 in the event it is desirable to do so. It is important, however, to determine the number and/or size of the apertures in order to allow more water to escape when water velocity is higher and to allow less water to escape when the water velocity is lower, the objective being to obtain a relatively constant head of water over the length and cross section of the blocks 66 in the basin 26. A further consideration is to make such size sufficient to prevent the egress of the media through the panels 44.

Figure 14:
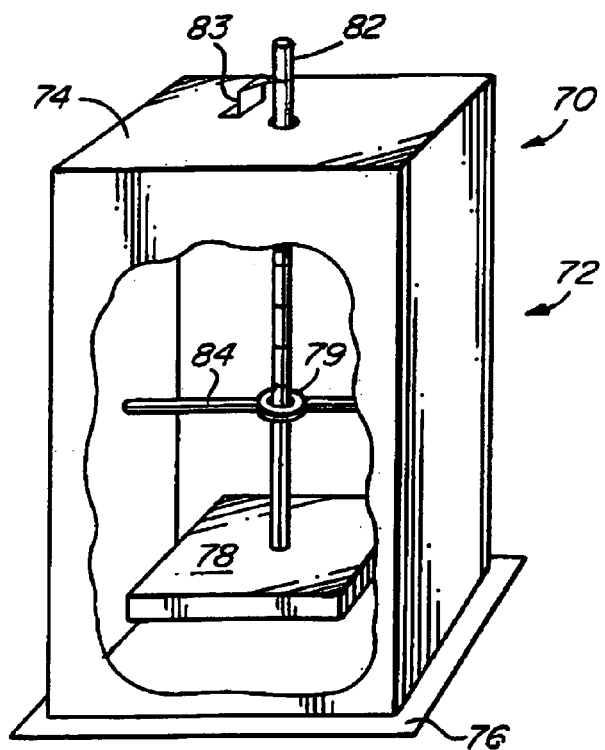
FIG. 14 is an isometric view illustrating an apparatus used to measure the hydraulic head of water according to a further aspect of the invention.
Figure 15:
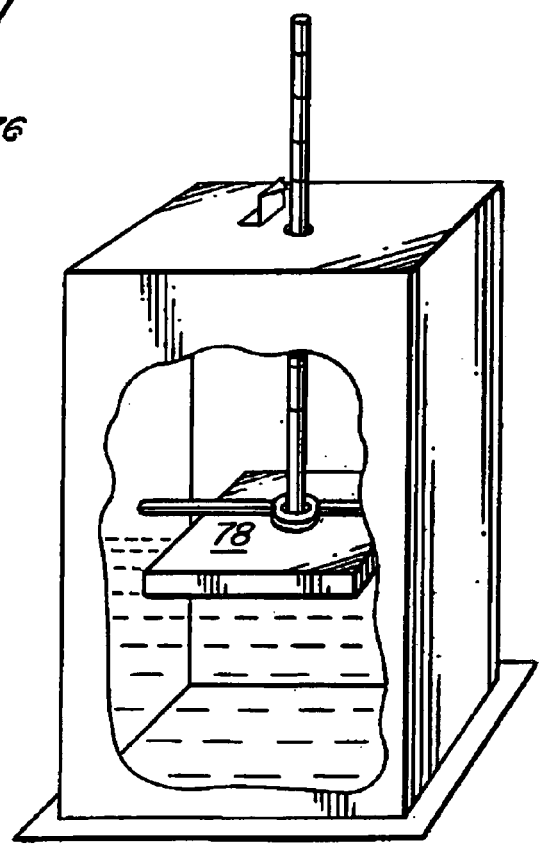
FIG. 15 is an isometric view illustrating the apparatus of FIG. 14 in its operating condition with an inflow of backwash water.

To measure the hydrostatic head along the various cells and, therefore, to determine the desired release of water from the panel members 44, reference is made to FIGS. 14 and 15. Each of the cells generally illustrated at 70 comprise an elongate, generally rectangular housing 72 having a closed upper end 74 and an open lower end 76, the lower end 76 being dimensioned with a perimeter seal 85 of a size for a typical filter underdrain element 66 (FIG. 9). The height of the housing 72 is such that since the housing 72 is intended to be attached to a filter underdrain element 66 and operates during the filter backwash cycle, the height should conveniently extend above the filter bed 20 (FIG. 1). In practice, it has been found that a housing 72 having a height of nine (9) feet is sufficient for most applications.

A float member 78 is suspended within the confines of the housing 72 and is free to rise and fall responsive to the backwash water flow 80 into the bottom of housing 72. An elongate graduated rule 82 is attached to the float member 78 with one end of the rule 82 extending through the closed upper end 74 of the housing 72. The intervals between graduations on rule 82 are conveniently three (3) inches apart. Rule 82 will rise and fall with float 78.

A reference pointer 83 is attached to the upper end 74 of the housing 72 adjacent the graduated rule 82 extending through the upper end 74 of the housing 72. The pointer 83 allows determination of the rise and fall of the float member 78 within the housing 72.

The float member 78 and the attached rule 82 are generally centralized within the housing 72 by a rod 84 mounted transverse to the sides of the housing 72. A central ring member 79 encircles the body of the graduated rule 82. Thus, sideways movement of the float member 78 within the housing 72 is restricted to a preset limit. Conveniently, mounting the rod 84 approximately seventy-eight (78) inches from the lower end 76 of the housing 72 allows sufficient lift distance for float 78.

As described in association with FIG. 1, filtered backwash water is periodically introduced into the troughs or channels 42 running beneath the false bottom and escapes upward into the filter bed via orifices in the underdrain 66 to fluidize the filter bed 20 and break loose particles trapped in the filter media. Since water flowing at a relatively high velocity across an orifice will not be discharged through the orifice as readily as when flowing at a lower velocity, flow from the underdrain elements 66 closest to the backwash water inlet 42 will tend to be less than the flow through those underdrain elements farthest from the inlet 42 thereby resulting in a difference in head and flow maldistribution. The cell 70 allows quantification of the extent of flow maldistribution by measuring the float movement thus allowing for appropriate corrective action such as increasing or decreasing the number and/or size of the perforations or apertures 60 (FIG. 7) in panels 44.

A plurality of housings 72, each being utilized to acquire a measurement of the rate of flow backwash water through an individual underdrain element 66, will provide head information across the underdrain system. Each of the individual elements or clay blocks of the underdrain system need not be tested. Rather, disparate test points are conveniently chosen. Thus, measurements are first made along a row of underdrain blocks nearest the backwash water inlet 42 followed by sample measurements in an area of blocks further from the backwash inlet 42. Conveniently, this general procedure may be repeated in columnar fashion in order to provide a more complete hydraulic water flow model representative of the existing backwash flow from the underdrain.

The lower end 76 of the housing 72 of each cell 70 is removably attached to the upper surface of a respective underdrain element 66 and a substantially watertight seal is provided. A reference level is established across each cell 70 by float 78 and the backwash cycle is commenced. As backwash water enters each cell 70 from underdrain element 66, the float 78 rises. The rate of rise of float 78 and thus the rate of flow of backwash water into each cell 70 is determined by recording the rise over a predetermined period as rule 82 moves upwardly through the upper end 74 of the housing 72 and past the reference pointer 83.

Enough measurements are recorded to build a representative hydraulic model of backwash flow distribution. Thereafter, corrective action is taken to reduce any maldistribution in the backwash flow by selectively restricting flow through certain of the underdrain panels 44 which results in increased flow through the remaining elements. The testing procedures may be repeated following panel installation to confirm that the corrective modifications have resulted in substantially uniform flow distribution across the underdrain system.

A further embodiment of the invention relates to the V-shaped arches illustrated in our U.S. Pat. No. 5,019,259 and also illustrated in FIGS. 18A and 18B. In the prior art embodiment shown in those figures, there is disclosed a plurality of arches 101 joined together with brackets 102 and positioned over the underdrain filter media comprising clay blocks 105. The arches 101 have an air passageway 103 in addition to the water passageway 104 which allows air scouring to occur during the backwash operation. Air scouring can improve the removal of impurities in the filter media.

Figure 18A:
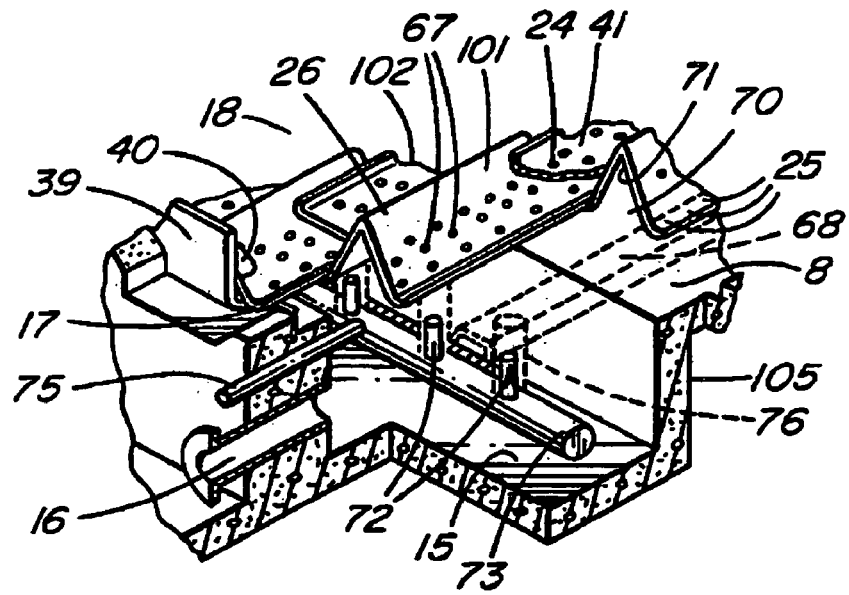
FIG. 18A is an isometric view of a backwash water/air system including longitudinal flutes or arches according to the prior art.
Figure 18B:
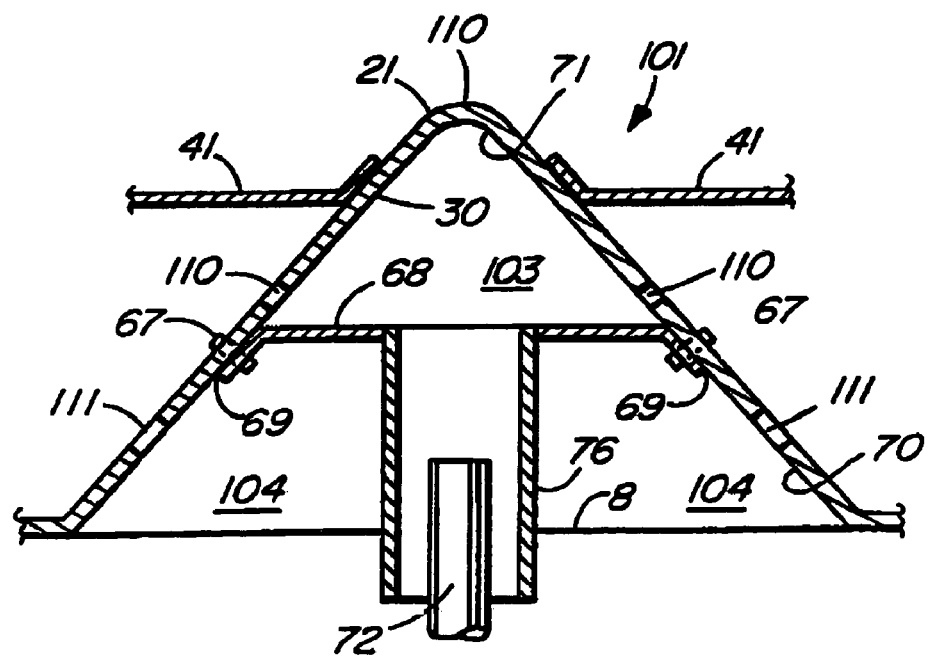
FIG. 18B is an enlarged elevation view of the flute or arch of FIG. 18A.

One problem with the arches illustrated in FIGS. 18A and 18B, however, was that media retention by the arches 101 suffered; that is, the media could frequently pass through the air and water openings 110, 111 in the arches 101 so that, over time, the media would become reduced to such an extent that media replacement was necessary. A further problem related to the need for multiple tool changes in producing the air and water holes 110, 11 in the arches 101 throughout the length of each individual arch 101.

Figure 19:
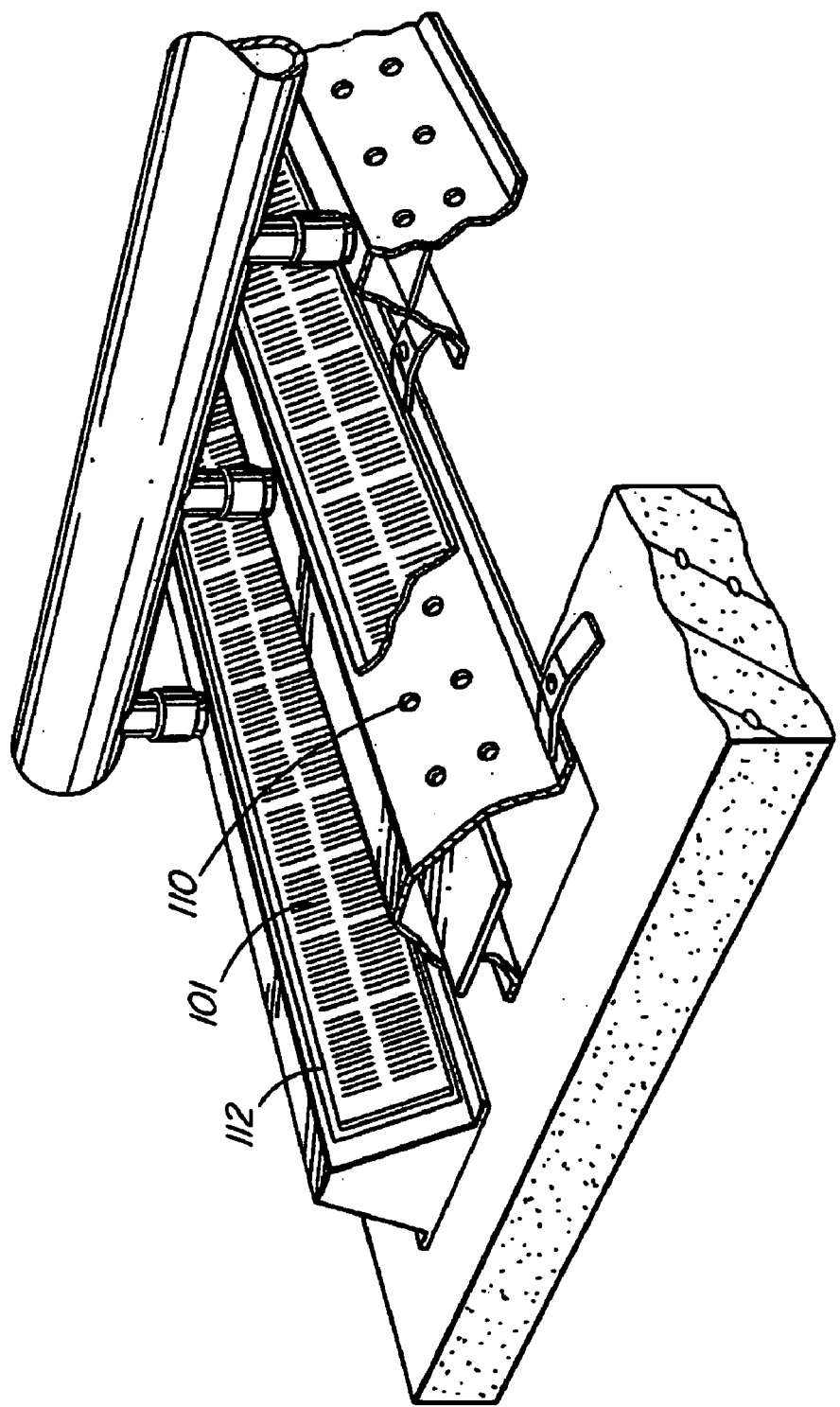
FIG. 19 is an isometric view of flutes used in a backwash water system according to a further development within the prior art.

To prevent the egress of media and to assist with reducing the number of tool changes, plates or panels 112 were attached to the arches 101 illustrated in FIG. 19 on each side of the upwardly directed portions meeting at the apex. Each of the plates 112 had a series of rectangular perforations or apertures 113 punched therein which total cross-sectional area would relate to the area of the water openings 111 in the arches 101. The water openings 111 remained in the arches 101 but their cross-sectional area was constant throughout the length of arch 101 which assisted the manufacturing process. The openings in the plates 112 were varied thereby to prevent media egress and also to adjust water release to obtain a constant discharge flow rate throughout the length of the arches 101. The number of apertures 111 in the plates 112 was likewise varied so as to allow fewer apertures further from the water inlet. In this case, the apertures 111 were all the same size.

While the plate attachment process described overcame the problems of media egress and tool changes, however, there were unnecessary manufacturing steps still present and the panels 112 were relatively expensive to produce and install due to their configuration.

Figure 20A:
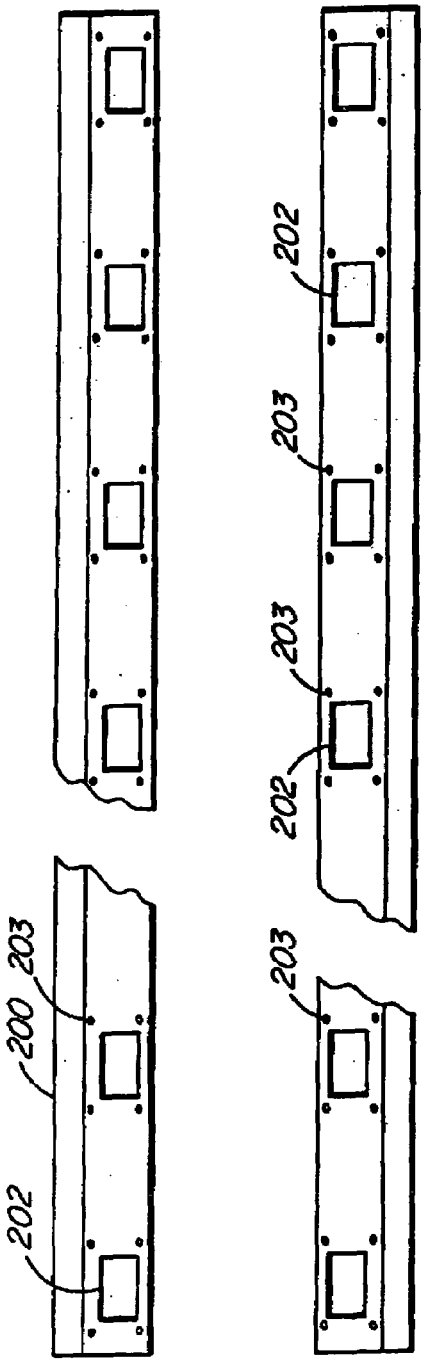
FIGS. 20A–20C are diagrammatic views of a longitudinal flute or arch according to a further aspect of the invention which arch is used for test purposes, the figures not showing the normally used air passageway for ease of explanation.
Figure 20C:
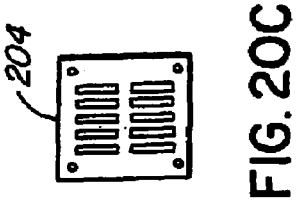
Figure 20B:

Reference is now made to FIGS. 20A–20C wherein a typical arch 200 is shown. This particular arch 200 is a test arch used to determine proper replacement for arch 101 of FIGS. 18 and 19 as will be explained hereinafter but the comments made concerning arch placement and position also apply to arches normally used in actual operations. The length of arch 200 may vary according to the size of the filter and a plurality of such arches are laid side by side to cover the width of the filter. Arch 200 conveniently includes the air passageway found beneficial for air scouring. However, rather than the plurality of water holes 110, 111 of FIG. 18B, there are a plurality of rectangular openings 202 provided of identical size which are positioned intermittently along the entire length of the arches 200. As well, attachment holes 203 are provided which are used to attach plates 204, shown in greater detail in FIG. 20C.

Figure 21C:
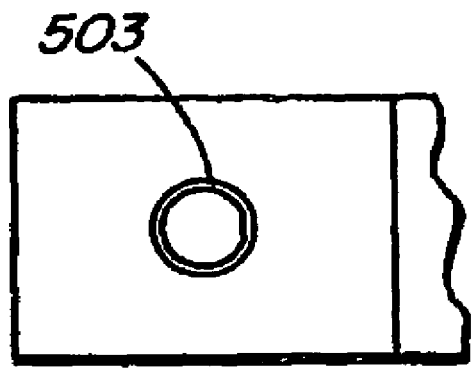
Figure 22:
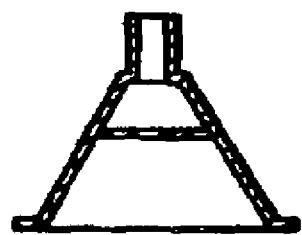
FIG. 22 is a sectional view taken along 22—22 of FIG. 21B.
Figure 23:
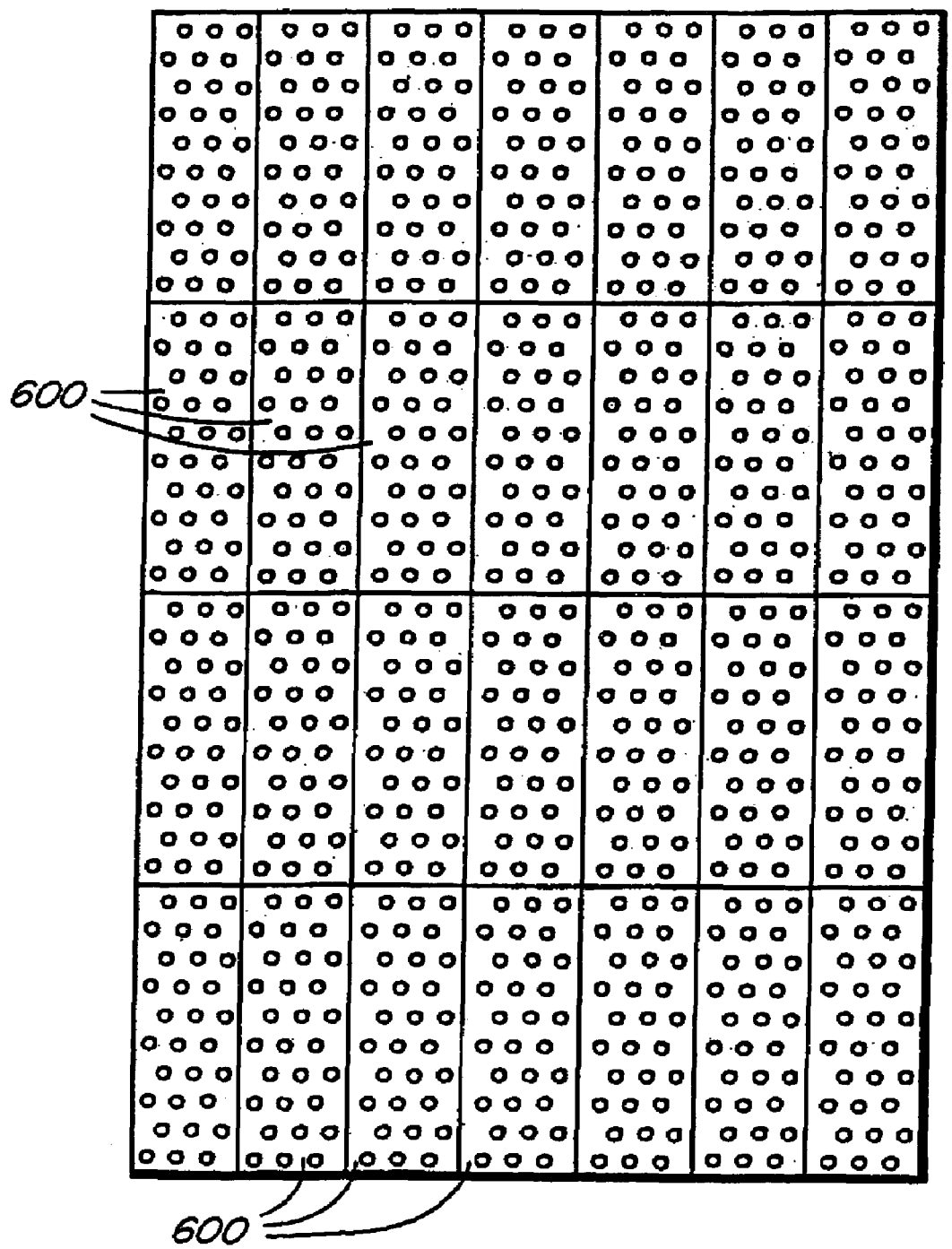
FIG. 23 is a plan view of a typical media bed illustrating the clay blocks comprising the media bed with the water orifice holes in the upper surfaces.
Figure 24:
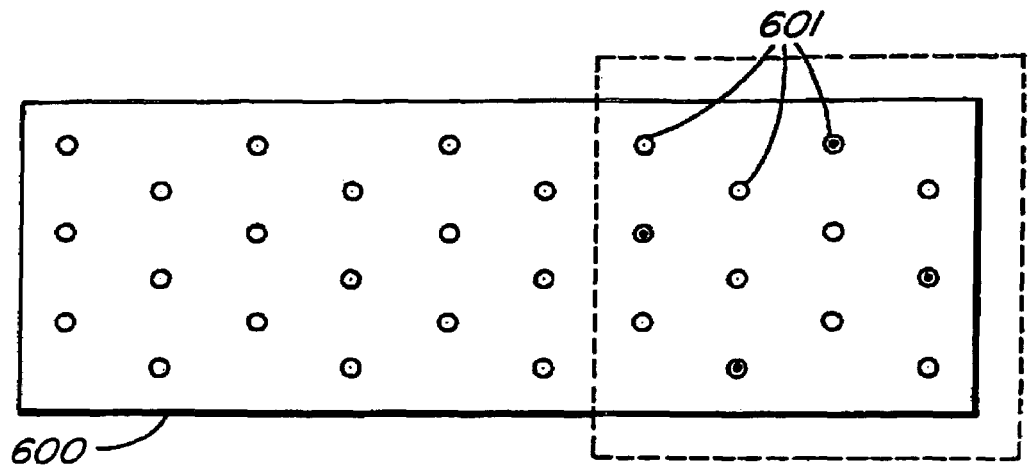
FIG. 24 is a plan view of a single clay block of the underdrain.

This embodiment allows media retention thereby preventing the migration of media through the previous holes in the arches 101. As well, the individual plates 204 which are readily connected to the arches 200 may be individually designed with greater or lesser cross-sectional area in the perforations or apertures punched therein and which plates 204 may likewise be provided with a greater or lesser number of apertures 202 which may be of the same size. Thus, the amount of water exiting the plates 204 and used for backwash can be designed to be relatively consistent along the entire length of arch 200 by specifically providing plates 204 with predetermined cross-sectional openings which plates 204 are then positioned on the arch 200 where desired. Specifically, the plates will ordinarily be designed with greater cross-sectional area by way of increased number of apertures 202 near the entranceway of the water to the arch 200 and with a decreased number of apertures 202 near the end of the arch 200 downstream from the entranceway. Once the desired water discharge is obtained, arches as generally illustrated at 500 in FIGS. 21A and 21B are produced. Arches 500 have a plurality of apertures 501 punched directly into the arches 500, which apertures 501 are conveniently horizontal and in double rows as is illustrated, although vertical apertures could also be used as well as apertures of virtually any orientation. The individual apertures 501 will be the same size but the number of such apertures 501 will typically vary, there being an increased number of apertures 501 near the water inlet 503 (FIG. 21C) and a reduced number of apertures 502 at the far end of the arches 500 as is illustrated.

The arches 500 are easier to manufacture, with the previously existing holes of variable diameter along the length being replaced with openings of consistent size but varying in number. The number of apertures selected may follow head measurement as previously described in association with FIGS. 14 and 15 or by using the removable plates 204 of FIGS. 20A–20C.

Figure 16A:
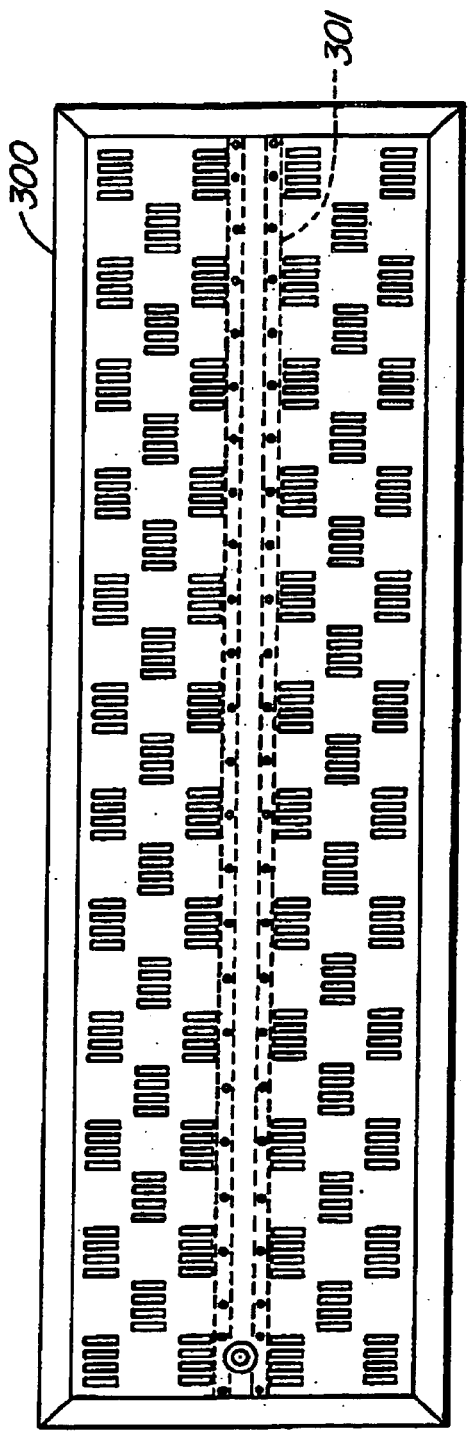
FIGS. 16A–16E are views illustrating a panel member according to FIG. 2 but further utilising an air distribution or scouring capability/conduit as used with water backwash according to a further aspect of the invention.
Figure 16E:
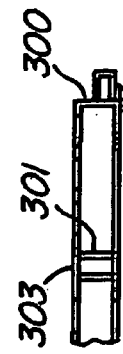
Figure 16B:
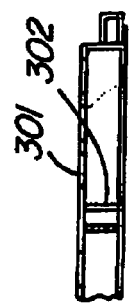
Figure 16C:
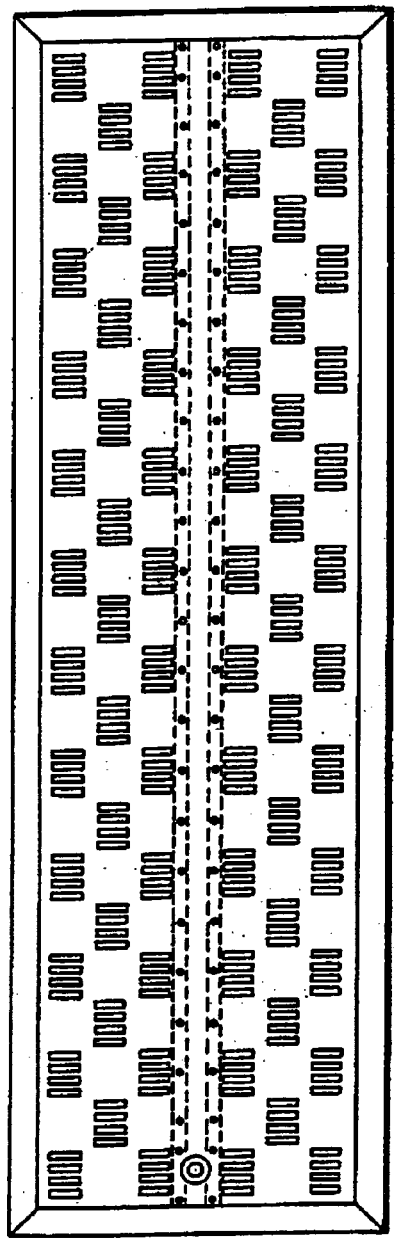
Figure 16D:
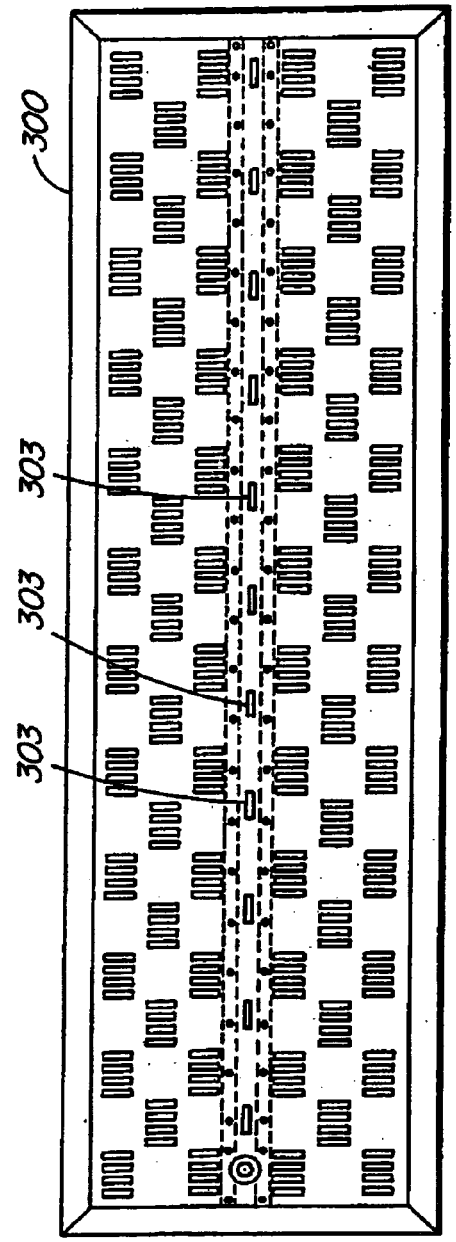

Yet a further embodiment of the invention relates to the addition of air passageways in the panel members 44 (FIG. 9) as illustrated in FIGS. 16A–16D and 17A–17B. Since air scouring has been found useful to increase the efficiency of the backwash operation, an air passageway is provided in panel member 300 in the form of an inverted hat section 301 (FIG. 16B) into which air is introduced. In a first configuration, openings 302 are provided in the hat section 301 to release the introduced air under pressure sidewise beneath panel 300. In a second configuration as illustrated in FIGS. 16D and 16E, air openings 303 are provided in the panel member 300 itself directly above the hat section 301 such that the air passing through the hat section 301 exits the section 301 upwardly from the panel where scouring takes place. This latter configuration has the advantage in that the punching operations are carried out on only one member, namely panel 300, so production costs are reduced.

Figure 2:
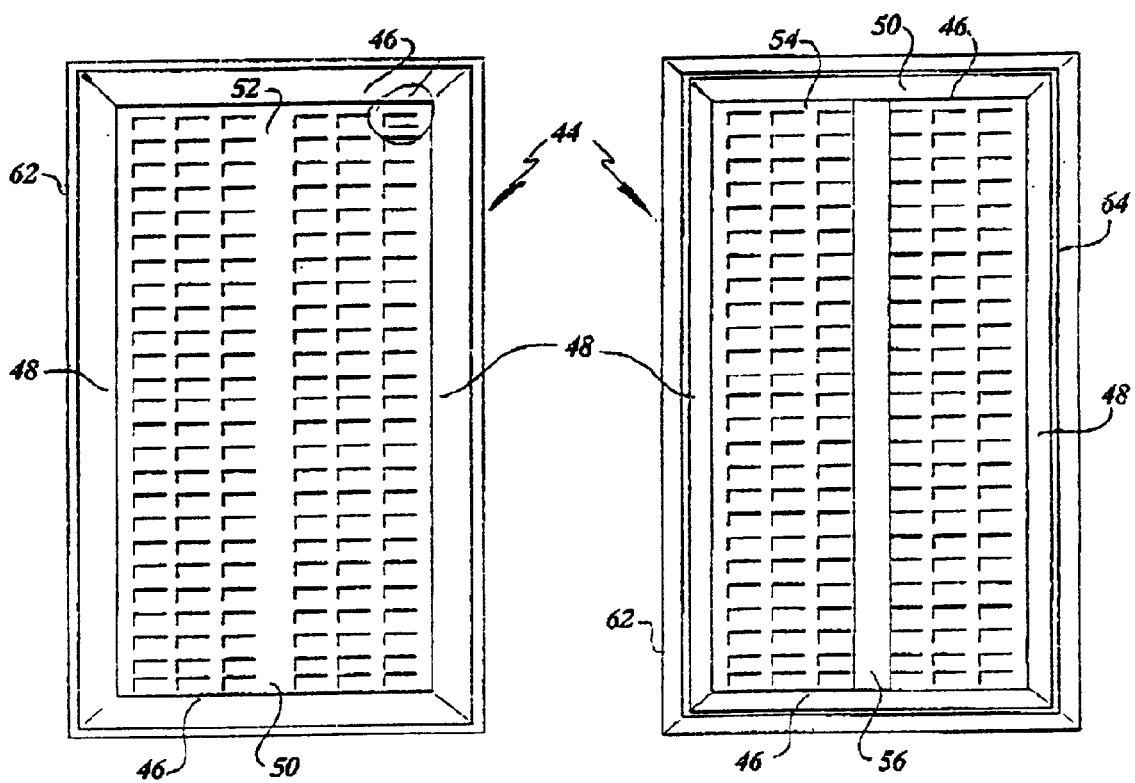
FIG. 2 is a plan view of a panel member according to the present invention.
Figure 3:
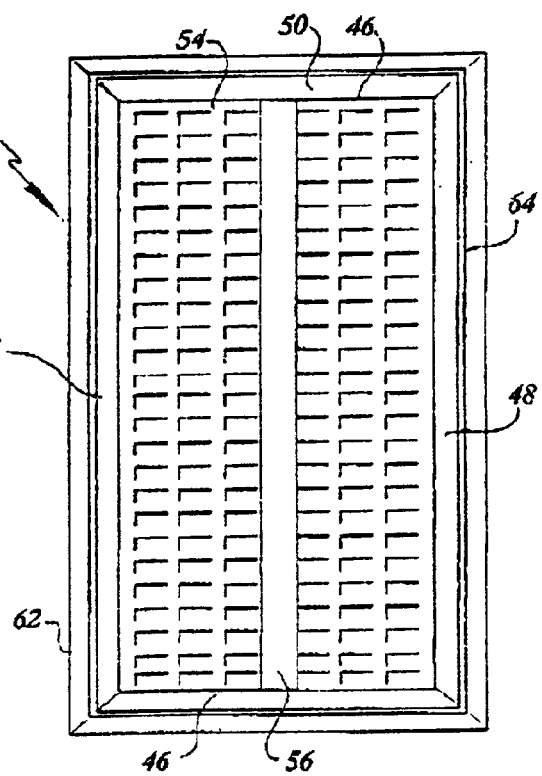
FIG. 3 is a bottom view of the panel member of FIG. 2.
Figure 4:
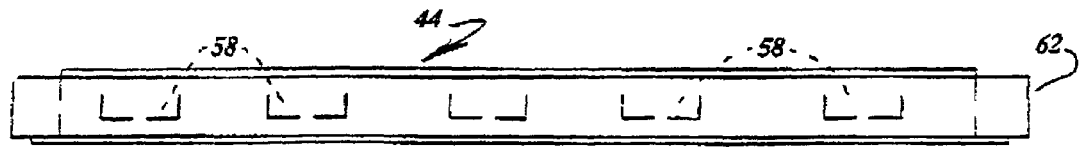
FIG. 4 is a side view of the panel member of FIG. 2.
Figure 5:
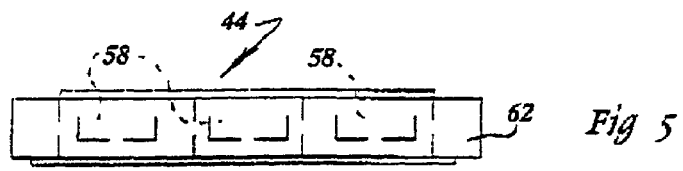
FIG. 5 is an end view of the panel member of FIG. 2.
Figure 6:
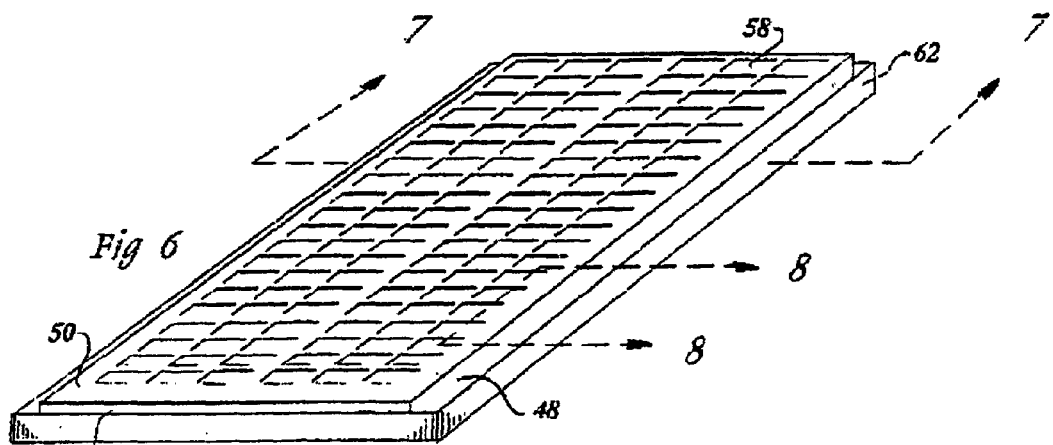
FIG. 6 is an isometric view of the panel member of FIG. 2.
Figure 7:
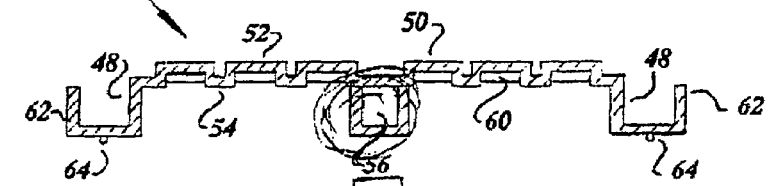
FIG. 7 is a sectional view taken along 7—7 of FIG. 6.
Figure 8:
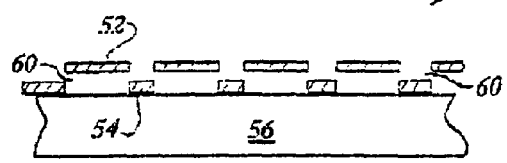
FIG. 8 is a sectional view taken along 8—8 of FIG. 6.
Figure 17A:
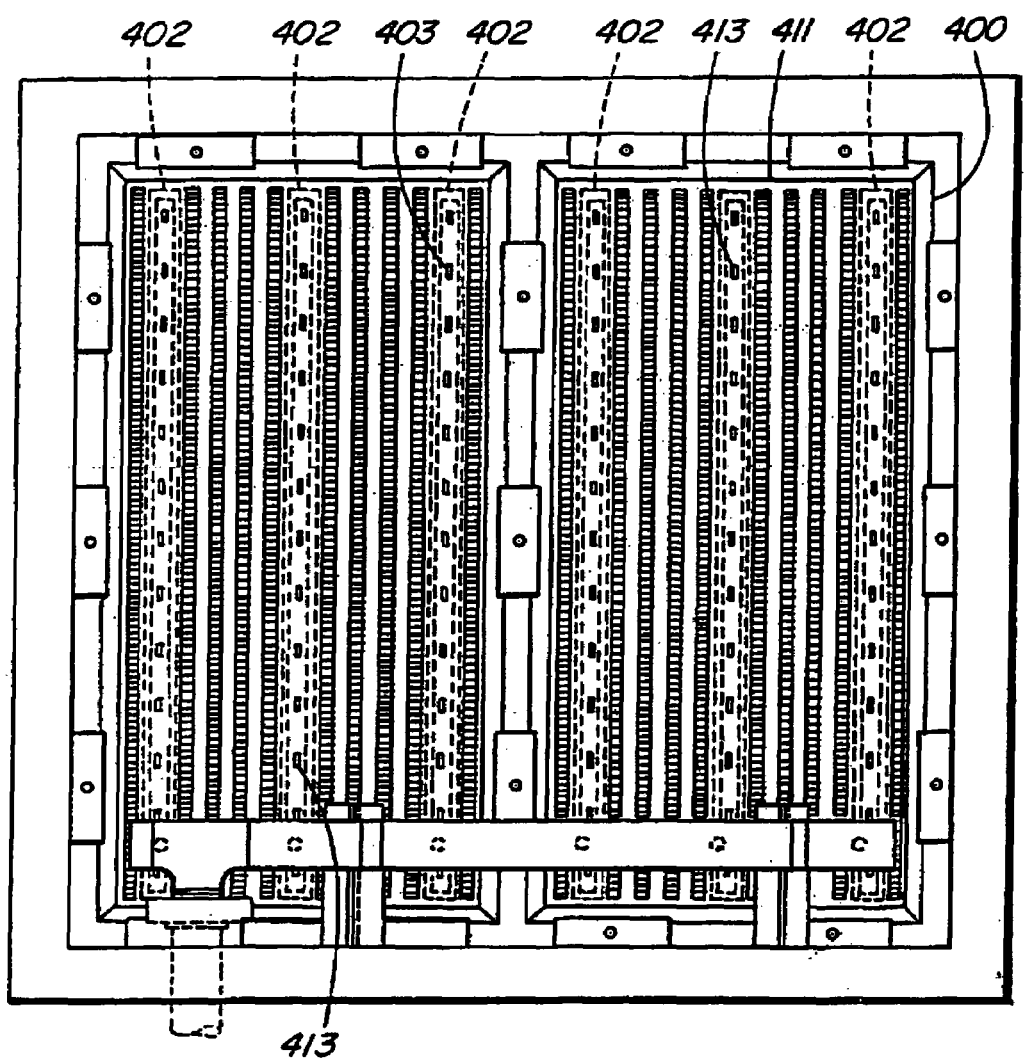
FIGS. 17A and 17B and plan and side views, respectively, of a panel member utilising air scouring according to a further aspect of the invention.
Figure 17B:
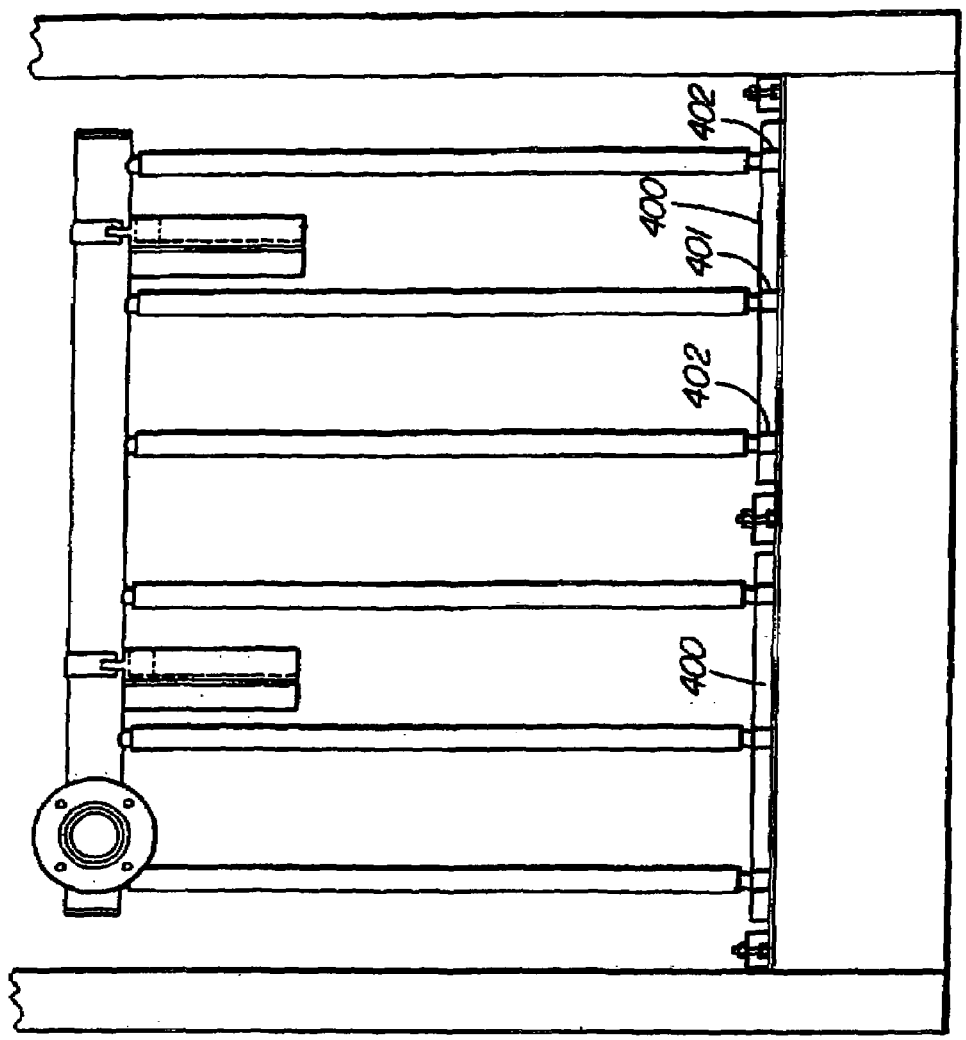

A further embodiment of the invention is illustrated in FIGS. 17A–17B. In this embodiment, the panel members 400 are significantly larger than the panel members 44 (FIG. 2). These panel members 400 cover a greater amount of the underdrain 66 since several filter underdrain elements or clay blocks 66 may be covered by the panel 400. A greater amount of water therefore passes upwardly through the panel member 400 and to allow for the increase in air scouring necessitated by the increase in water flow, three (3) inverted hat sections 401, 402 are used, the two side sections 402 being located equidistant from the center section 401. Otherwise, the operation is identical to the operation of the embodiment of FIGS. 16D and 16E; that is, air is introduced into each of the hat sections 401, 402 and escapes from openings 403 in the panel 400 directly above each inverted hat section 401, 402.

Although the panels 44, 300, 400 of the present invention are illustrated as being positioned as caps on conventional filter underdrain blocks 66, the panels will function effectively in the control of backwash flow maldistribution without the underdrain blocks 66 and will provide effective backwash water distribution control in any situation wherein the elements can be mechanically fastened and suitably sealed to an appropriate substructure. Likewise, while the panels 44, 300, 400 are illustrated in generally rectilinear form, the number and size of the perforations and apertures may be provided in panels of different configuration such as semicircular or triangular panels.

In yet a further embodiment of the invention, reference is made to FIGS. 23 through 26. In this embodiment, panel members which have been previously described have apertures that are all the same size and number may be positioned over the clay underdrain blocks 600 as viewed in FIG. 23. In order to allow for the correct water flow from the underdrain blocks 600, the holes 601 (FIG. 24) are selectively plugged using the nylon plug or insert 602 with a screw 603 which acts to expand the plug or insert 602 when it is inserted. With reference to FIG. 25A, two holes 604 have been plugged and the remaining holes 610 remain open and not plugged. Thus, the water flow from the block 600 is reduced a predetermined amount. Likewise, other underdrain blocks 600 may have a greater or lesser number of holes plugged, the objective being to have water outflow from the underdrain blocks 600 substantially constant over the entire underdrain are with its concomitant advantages. Thereafter, panel members which may all contain the same number and size of apertures can be used over the underdrain to prevent media egress and to allow air scouring if desired.

Figure 27:
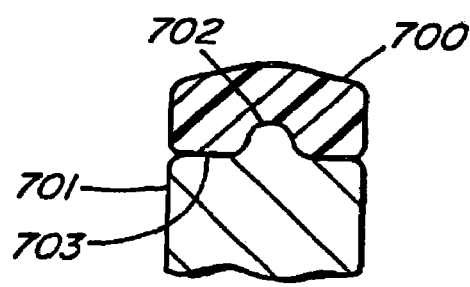
FIG. 27, appearing with FIG. 24, is a sectional view of a seal intended to be located between the clay block and the panel member which panel member has a formed ridge or protuberance extending into the seal according to a further aspect of the invention.
Figure 25A:
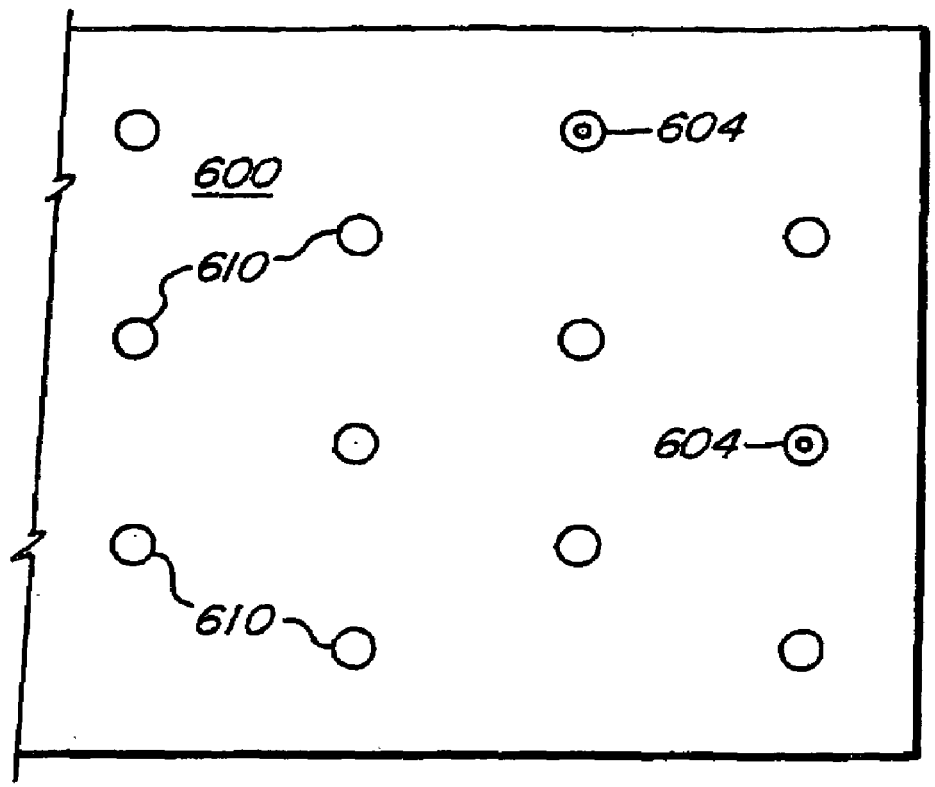
FIGS. 25A and 25B are enlarged plan and side views, respectively, of the clay block of FIG. 24.
Figure 25B:
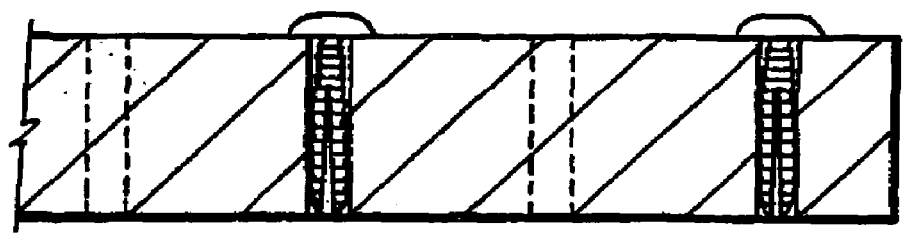
Figure 26:
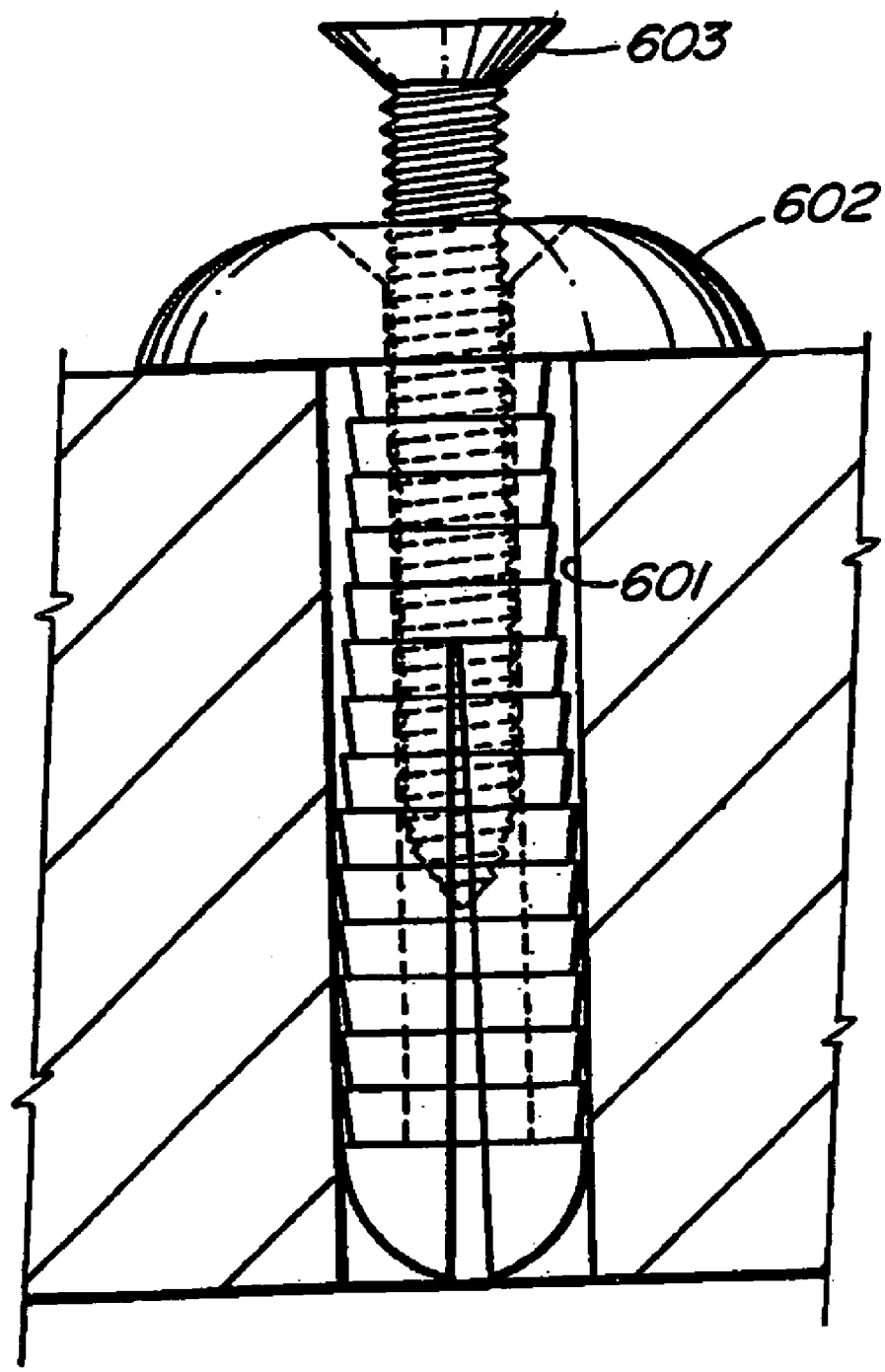
FIG. 26 is an enlarged view particularly illustrating the plug used to block the holes of the clay block of FIG. 24.

Reference is made to FIG. 27 in which a seal 700 is located between the panel member 701 and the underdrain block (not shown). The panel member 701 is manufactured with a rise or ridge 702 in its circumferential area 703. The ridge 702 applies pressure on one side of the seal 700 which assists in the retention of the seal 700 and which also assists the sealing action between the seal 700 and the underdrain block.

While the method of measuring hydraulic head on the underdrain system described herein uses a rule and an indicator, it should be understood that this elementary and basic measurement technique serves to best explain the technique. It is clearly contemplated that a more sophisticated measurement technique could be used, such technique using electrical analog or digital signals and such measurements being recorded through an appropriate computer interface or other recording medium. Likewise, a float need not be used. Rather, a stationary resistance measuring strip, for example, could be positioned within the measuring cell, thereby sensing the depth of water over time and transmitting such information to a receiving station located on or remotely from the transmitter. Other sensing devices are clearly usable if desired.

While the term "filter underdrain" is commonly used, the invention is not restricted to filters. Various types of water/waste and process equipment utilise improved backwash distribution which do not use filters. Examples of such equipment include up flow or down flow contact clarifiers, activated carbon contactors, ion exchange units, iron removal units, including those of the greensand/catalyzed sand type, catalyst bed contactors, including desilicizers; and neutralizing media contactors. Thus, it is intended that the term "filter underdrain" be used and understood to encompass units other than filters.

Further, in some process equipment vessels such as upflow mode filters and contact clarifiers, the underdrain serves a different function than in downflow, that is, it serves to distribute incoming service flow as well as backwash. Backwash in filter is a periodic reverse flow of filtered water through the media to flush out trapped impurities. The term is used in ion exchange and carbon contactors as well, but in filters, dirt is flushed from the bed by backwash. In ion exchange, carbon contactors and the like, water is typically filtered in advance so backwash serves to loosen and then resettle the bed to eliminate packing and flow channelling so that contact is improved and short circuiting averted in carbon contactor units. In ion exchangers a backwash is required to wash any dirt from the bed, but more to loosen and then resettle the bed so that regenerant contact is maximized and regenerant short circuiting avoided.

While the apparatus illustrated in FIG. 1 illustrates a common backwash filter system, the panels according to the present invention are adaptable to other configurations, such configurations including a transversely extending trough or flume or embedded pipe across the center width with filter outflow and backwash inlet at the side; a trough or flume or embedded pipe running the length of the filter down the center line, or along one side, or externally down one side; and circular filters with cross diameter inlet/outlet flume or trough or embedded pipe with the underdrain of the present invention running transversely to such trough or flume.

A variety of materials may conveniently be used to fabricate the filter underdrain panels 44. Painted or galvanized steel, aluminum, fiberglass, various types of plastics and fiber reinforced plastics, concrete are examples. The preferred material, however, is 304 or other grade stainless steel because of the strength and high corrosion resistance properties of this material.

While the invention has been disclosed by way of various specific examples, such embodiments are illustrative of the invention only and should not be taken as limiting its scope. Many modifications will readily occur to those skilled in the art to which the invention relates and it should be limited only by reference to the accompanying claims.

We claim:

1. A filter underdrain assembly for controlling backwash water flow in a filtration system having a backwash water inlet, said filter underdrain assembly comprising a plurality of panel members forming a grid like underdrain, each panel member having a plurality of apertures, the cross-sectional area of said apertures in said panel members varying between said panel members, said apertures of said panel members being located further away from said backwash water inlet of said filtration system having a lesser cross-sectional area relative to said cross-sectional area of said apertures of said panel members closer to said backwash water inlet of said filtration system.

2. A filter underdrain assembly as in claim 1 wherein said apertures in said panel members are elongate slots.

3. A filter underdrain assembly as in claim 2 wherein said panel member has upper and lower surfaces and further comprising an air passageway in said panel members.

4. A filter underdrain assembly as in claim 3 wherein said air passageway releases air below said upper surface of said panel member.

5. A filter underdrain assembly as in claim 3 wherein said air passageway releases air above said upper surface of said panel member.

6. A filter underdrain assembly as in claim 3 wherein said air passageway extends below said upper surface of said panel member, said air passageway being formed from interconnected surfaces defining sides and a bottom, said sides having perforations to allow air to escape from said air passageway below said upper surface of said panel member.

7. A filter underdrain assembly as in claim 3 wherein said air passageway extends below said upper surface of said panel member, said air passageway being formed from interconnected surfaces defining sides and a bottom, said air passageway having perforations extending through said upper surface of said panel member.

8. Filter underdrain apparatus for controlling backwash water flow maldistration in a filtration system from a backwash water inlet, said filter underdrain apparatus comprising a plurality of panel members assembled adjacent each other to form a grid like underdrain, each panel member having multiple punched bridges in a surface thereof, each bridge defining a pair of slotted water inlet/outlets and wherein the number and/or size of said punched bridges are varied from panel member to panel member, said panel members furthest away from said backwash water inlet of said filtration system having a lesser number of bridges or smaller slotted inlet/outlets from said panel members nearer to said backwash water inlet of said filtration system, said panel members being operable to provide a substantially equalized water flow through the underdrain assembly from said panel members.

9. Apparatus according to claim 8 wherein said multiple punched bridges are sized to substantially prevent the passage of filter media therethrough.

10. Apparatus according to claim 9 and further comprising an attachment for attaching each of said panel members to adjacent panel members for securing said panel member to said underdrain assembly.

11. Apparatus according to claim 10 and further comprising a seal for forming a substantially watertight seal between a surface of each of said panel members and said underdrain.

12. Filter underdrain assembly for controlling backwash water flow from a backwash water inlet associated with a filtration system, said filter underdrain assembly comprising a plurality of panel members forming a grid like underdrain, each panel member having a plurality of bridges, the number or cross-sectional area of said bridges varying between said panel members, said panel members located further away from said backwash water inlet of said filtration system having a lesser number or smaller cross-sectional area of said bridges relative to those of said panel members located closer to said backwash water inlet of said filtration system, said panel members being operable to substantially equalize water flow from each of said panel members of said filter underdrain assembly.

* * * * *